United States Patent
Ballew et al.

(10) Patent No.: US 12,381,810 B2
(45) Date of Patent: Aug. 5, 2025

(54) SYSTEMS AND METHODS FOR CLOAKING ROUTES

(71) Applicant: CenturyLink Intellectual Property LLC, Denver, CO (US)

(72) Inventors: Dean Ballew, Sterling, VA (US); John R. B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 12 days.

(21) Appl. No.: 18/647,356

(22) Filed: Apr. 26, 2024

(65) Prior Publication Data

US 2024/0372798 A1 Nov. 7, 2024

Related U.S. Application Data

(60) Provisional application No. 63/500,146, filed on May 4, 2023.

(51) Int. Cl.
*H04L 45/03* (2022.01)
*H04L 45/00* (2022.01)
*H04L 45/02* (2022.01)

(52) U.S. Cl.
CPC .............. *H04L 45/03* (2022.05); *H04L 45/04* (2013.01); *H04L 45/22* (2013.01)

(58) Field of Classification Search
CPC .......... H04L 45/03; H04L 45/04; H04L 45/22
See application file for complete search history.

(56) References Cited

U.S. PATENT DOCUMENTS

| | | | |
|---|---|---|---|
| 7,653,059 B1* | 1/2010 | Slaughter | H04L 45/28 370/392 |
| 10,200,274 B1* | 2/2019 | Suryanarayana | H04L 49/70 |
| 2013/0201909 A1* | 8/2013 | Bosch | H04L 45/02 370/328 |
| 2016/0308767 A1* | 10/2016 | Borgione | H04L 45/023 |
| 2021/0135982 A1* | 5/2021 | Chaturmohta | H04L 43/10 |

* cited by examiner

*Primary Examiner* — Rachel J Hackenberg
*Assistant Examiner* — Jihad K Boustany

(57) ABSTRACT

In a network system, network switching devices such as routers may store routes to various networks. The system may on occasion be reconfigured, e.g., as new network switching devices are brought on line, or as servers are moved to new locations. Such reconfiguring may involve the storing of new routes in a network switching device, or the deletion of routes stored in a network switching device. As such, systems and methods for cloaking routes are provided.

18 Claims, 5 Drawing Sheets

SYSTEMS AND METHODS FOR CLOAKING ROUTES

CROSS-REFERENCE TO RELATED APPLICATIONS

This application claims the benefit of U.S. Provisional Application No. 63/500,146 filed May 4, 2023, entitled "Systems and Methods for Cloaking Routes," which is incorporated herein by reference in its entirety.

FIELD

One or more aspects of examples according to the present disclosure relate to networking, and more particularly to systems and methods for cloaking routes.

BACKGROUND

In a network system, network switching devices such as routers may store routes to various networks. The system may on occasion be reconfigured, e.g., as new network switching devices are brought on line, or as servers are moved to new locations. Such reconfiguring may involve the storing of new routes in a network switching device, or the deletion of routes stored in a network switching device.

It is with respect to this general technical environment that aspects of the present disclosure are related.

SUMMARY

Systems and methods for cloaking routes are provided. In an aspect, a system includes a router, comprising at least one processing circuit and memory, operatively connected to the at least one processing circuit. The router may be configured to determine that a route to a resource is to be cloaked, advertise the withdrawal of the route, retain the route in storage, and determine whether a sufficiency criterion is met. When it is determined that the sufficiency criterion is met prior to expiration of a time interval, the router may advertise the route; and when it is determined that the sufficiency criterion is not met prior to the expiration of the time interval, the router may delete the route in storage.

In examples, the advertising of the withdrawal comprises transmitting a withdrawal advertisement including an attribute indicating that the route has been cloaked. In examples, the advertisement includes an attribute indicating the time interval. In examples, the first router is part of a first autonomous system further configured to advertise the withdrawal of the route to at least a second router in a different autonomous system.

In examples, the sufficiency criterion comprises receiving at least a first petition to resume supporting the route. In further examples, the receiving of the first petition comprises receiving the first petition with authentication. In further examples, the receiving of the first petition comprises receiving the petition as a Border Gateway Protocol (BGP) update message with a "community" attribute set to signal an authenticated petition. In further examples, the first router is configured to receive a plurality of petitions, including the first petition, to resume supporting the route; and the sufficiency criterion comprises receiving at least a plurality of petitions. In addition, in some examples, the sufficiency criterion is met when the number of petitions of the plurality of petitions exceeds a threshold. Further, in some examples, each of the plurality of petitions includes a weight associated with a petition sender; and the sufficiency criterion is based on the weight associated with each sender.

In some examples, the system further comprises a network management system, connected to the first router. In addition, in some examples the network management system is configured: to detect that the first router has received a first petition to resume supporting the route; and to report that the first router has received a first petition to resume supporting the route. Further, in examples, the route is a first route to a network; a second router is configured to provide a second route to the network; and the network management system is configured: to determine that the second route does not meet a reliability threshold; and in response to determining that the second route does not meet a reliability threshold, to send the first petition. Further, in some examples, the determining that the route is to be cloaked comprises receiving an instruction to cloak the route.

Additionally, in some examples, the route is a first route to a network; and the network management system is configured: to determine that the route is no longer needed; to determine that a size of the network exceeds a threshold; and in response to determining that the network size exceeds a threshold, to instruct the first router to cloak the route.

In another aspect, a system is provided, comprising: a first router, the first router being configured: to receive a first message, indicating that a second router is withdrawing a first route, to a first resource; to store the first route as a candidate for a petition to resume supporting the first route; to determine that a set time has elapsed; to delete the first route from a list of candidates for petitions; to receive a second message, indicating that a third router is withdrawing a second route, the second route being a route to a second resource; to determine that it is no longer able to reach the second resource; and to send, to the third router, a petition to resume supporting the second route.

In another aspect, a method is provided, comprising: determining, by a first router, that a route is to be cloaked; advertising the withdrawal of the route; and retaining the route in storage; determining whether a sufficiency criterion is met; and when it is determined that the sufficiency criterion is met prior to expiration of a time interval, advertising the route; and when it is determined that the sufficiency criterion is not met prior to the expiration of the time interval, deleting the route in storage.

In some examples, the advertising of the withdrawal comprises transmitting a withdrawal advertisement including an attribute indicating that the route has been cloaked. In additional examples, the advertisement includes an attribute indicating the time interval. Further, in some examples, the first router is part of a first autonomous system further configured to advertise the withdrawal of the route to at least a second router in a different autonomous system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and other features and advantages of the present disclosure will be appreciated and understood with reference to the specification, claims, and appended drawings. The following drawing figures, which form a part of this application, are illustrative of aspects of systems and methods described below and are not meant to limit the scope of the disclosure in any manner, which scope shall be based on the claims.

DETAILED DESCRIPTION

The detailed description set forth below in connection with the appended drawings is intended as a description of exemplary embodiments of systems and methods for cloaking routes provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

Figure 1:
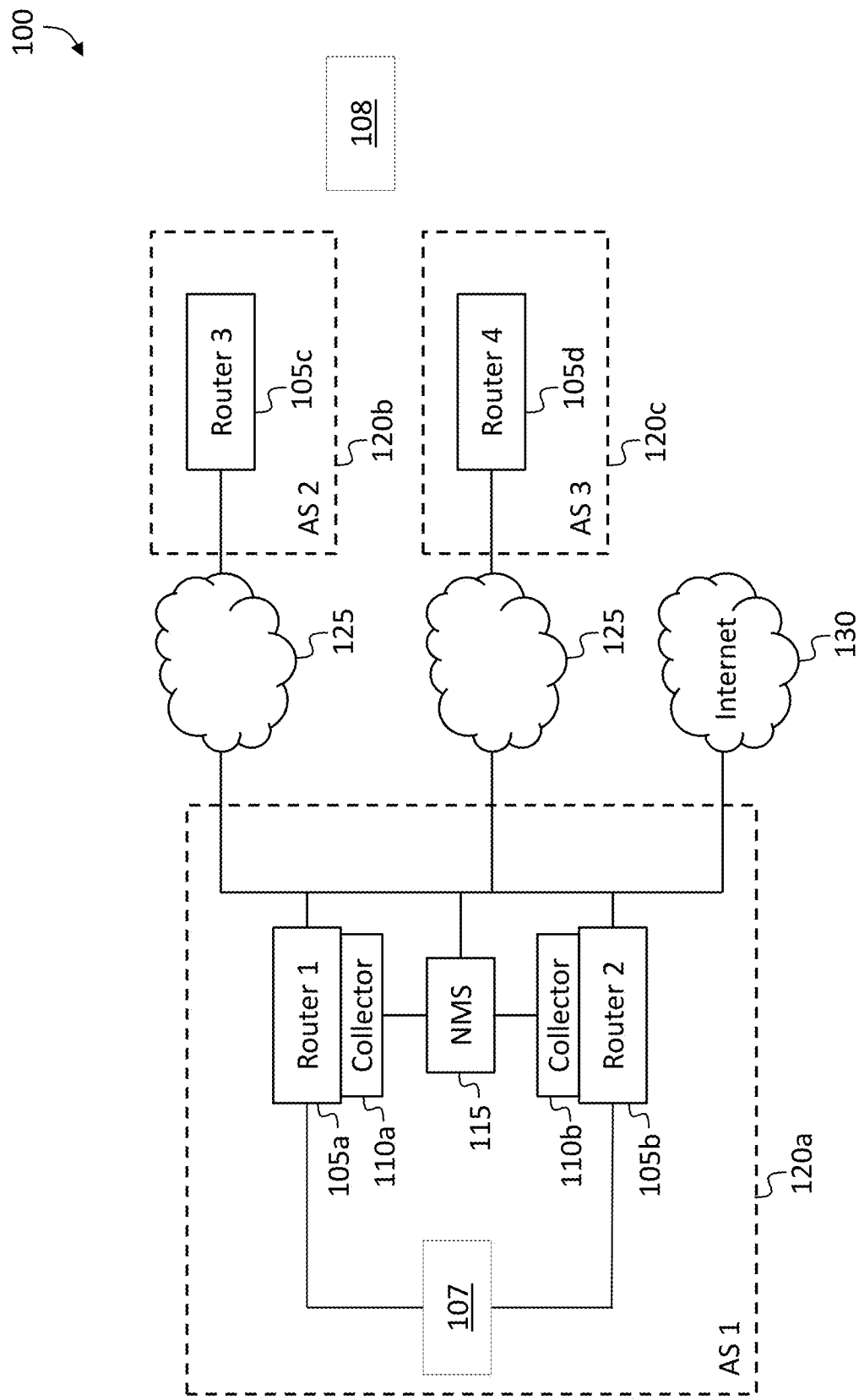
FIG. 1 is a block diagram of a portion of a network system, according to an example of the present disclosure.

FIG. 1 is a block diagram of a portion of a network system 100. A first autonomous system (AS 1) 120a includes a plurality of routers 105 including a first router 105a and a second router 105b, a first collector (e.g., a first NetFlow collector) 110a (connected to the first router 105a), a second collector (e.g., a second NetFlow collector) 110b (connected to the second router 105b), and a network management system (NMS) 115. Each of the first collector and the second collector 110b may be configured to monitor traffic processed by the first router 105a and the second router 105b, respectively, and to feed information about this traffic (or flow) to the network management system 115. In examples where the NetFlow protocol is used to collect data, the routers 105 operate as NetFlow exporters, and the collectors 110 operate as NetFlow collectors.

Other autonomous systems 120 may be connected to the first autonomous system 120a. For example, a second autonomous system 120b containing a third router 105c may be connected to the first autonomous system 120a through a set 125 of one or more network connections, and a third autonomous system 120c containing a fourth router 105d may be connected to the first autonomous system 120a through another set 125 of one or more network connections. The third router 105c and the fourth router 105d may be peers of the first router 105a and the second router 105b as a result of peering agreements between the first autonomous system 120a and (i) the second autonomous system 120b and (ii) the third autonomous system 120c. The first autonomous system 120a may also exchange nonpeering traffic, e.g., with network devices on the internet 130. In examples, third router 105c and fourth router 105d may provide routes to a second resource 108.

Routes may be shared between routers 105 within the first autonomous system 120a using internal Border Gateway Protocol (IBGP), and routes may be shared between routers 105 in different autonomous systems 120 using external Border Gateway Protocol (eBGP). As such, the routes available to a router 105 (such as the third router 105c) that is not in the first autonomous system 120a may be different than the routes available to a router 105 (such as the second router 105b) that is in the first autonomous system 120a or that is in the third autonomous system 120c, such as router 105d.

As mentioned above, the network system may on occasion be reconfigured, e.g., as new network switching devices are brought on line, or as servers are moved to new locations, and such reconfiguring may involve the deletion of routes stored in a router 105. For example, it may be that the second router 105b has recently been brought on line, and that for routing packets to a certain resource 107 it is superior to the first router 105a (e.g., the second router 105b may be geographically closer than the first router 105a to the resource 107 or to a requesting router). In such a situation, the second router 105b may advertise a route to the resource 107, and the first router may advertise the withdrawal of the route to the resource 107, e.g., it may transmit, e.g., to the peering routers 105c and 105d, a Border Gateway Protocol update message withdrawing the route. The first router 105a may also delete the route from its local storage. In examples, as used herein, a resource 107 may comprise an autonomous system (such as the first autonomous system 120a), an endpoint on such autonomous system, or separate network or autonomous system reachable through such an autonomous system.

In such a situation, if the second router 105b ceases to route packets (e.g., Ethernet frames) to the resource 107 (e.g., if its physical connection to external networks or internal resources fails or is intermittent), the peering routers 105c and 105d may become unable to access the resource 107 via the first autonomous system. Other routers in the first autonomous system 120a, however, may (e.g., because of the differences between routes distributed via internal Border Gateway Protocol, and routes distributed via external Border Gateway Protocol) remain able to access the resource 107, and it may be that network operations (e.g., a group of one or more system administrators operating network administration hardware) for the first autonomous system 120a may remain unaware, for some time, that the first autonomous system 120a (and one or more resource 107 available thereon or therethrough) has become unavailable.

As such, in some examples, a readily reversible method of withdrawing a route, referred to herein as "cloaking," may be employed. For example, after the second router 105b has advertised its route to the resource 107, the first router 105a may determine (e.g., based on an instruction it may receive from the network management system 115) that its route to the resource 107 is to be cloaked. The first router 105a may then cloak its route to the resource 107 by transmitting, e.g., to the peering routers 105c and 105d, a Border Gateway Protocol update message withdrawing the route, and it may retain the route in storage. When the route has been cloaked, attempts by other routers 105 to use the route may be declined (or ignored) by the first router 105a.

The first router 105a may, however, resume supporting the route, e.g., upon receiving one or more petitions to do so. For example, upon receiving the message indicating that the first router 105a is withdrawing the route to the network, the third router 105c may, instead of deleting the route from its internal storage, store the withdrawn route in a list of candidates for petitions (discussed in further detail below). When the third router 105c subsequently determines (e.g., when the link between the resource 107 and the second router 105b becomes inoperable and the second router 105b sends a withdrawal message for its route to the resource 107)

that it is unable to reach the resource 107, it may check its list of candidates for petitions (which may be a list of routes recently withdrawn by other routers 105), find the route to the resource 107 that was withdrawn by the first router 105a, and send a petition to resume supporting the route to the first router 105a. In response to receiving the petition, the first router 105a may resume supporting the route, e.g., it may advertise the route, and resume handling attempts by other routers 105 to use the route.

In some examples, the petition to resume supporting the route includes authentication, to ensure that the petition was sent by a trusted party, e.g., one of the peering routers 105c and 105d. The authentication may be a set of credentials included with the petition. In some examples, the authentication is provided by sending the petition as a Border Gateway Protocol update message with a pre-agreed upon "community" attribute set to signal an authenticated petition. If the first router 105a receives a petition lacking suitable authentication, it may disregard the petition or otherwise lessen the priority for the petition.

In some examples, a sufficiency criterion may be applied to determine whether one or more petitions to resume supporting the route, received by the first router 105a, are sufficient to resume supporting the route. For example, in some circumstances a single such petition may not be considered sufficient grounds to resume supporting the route, and the first router 105a may count received petitions until the number of received petitions (e.g., within a certain time period) reaches or exceeds a threshold (e.g., the sufficiency criterion may be met when the number of petitions exceeds the threshold) and the first router 105a may then resume supporting the route. The number of petitions that need to be received by the first router 105a may be configurable on router 105a, e.g., by the network management system, prior to deployment, or otherwise. In some examples, each peering router (e.g., each of the peering routers 105c and 105d) may be assigned a respective weight, depending, e.g., on the size of the network the peering router serves. In such an example the sufficiency criterion may also or instead be based on the respective weights of the routers 105 that have submitted petitions to resume supporting the route (e.g., the sufficiency criterion may be met when the sum of the weights of the routers 105 that have submitted petitions exceeds a threshold).

In some examples, the withdrawal message (e.g., the withdrawal advertisement) sent by the first router 105a when it is cloaking a route may include an attribute indicating that the route has been cloaked. This may be accomplished by the first router 105a by, for example, including an attribute in the withdrawal advertisement, indicating that the route is being cloaked. The attribute may be an indication of a time interval after the expiration of which the route will be deleted, by the first router 105a, from storage (with, e.g., a value of 0 indicating that the route is being withdrawn, not cloaked). In some examples, the time interval may instead be fixed (e.g., negotiated between the autonomous systems 120) or the first router 105a may select the time interval without informing the peering routers (e.g., the peering routers 105c and 105d), with the consequence that a peering router may on occasion (i) send a petition to resume supporting the route after the route has been deleted by the first router 105a, or (ii) forego sending a petition to resume supporting the route, based on an incorrect assumption that the route will have been deleted. In examples in which one of the peering routers 105c and 105d is informed, at least on some occasions, whether a route is being withdrawn or cloaked, the peering router may add the route to the list of candidates for petitions only when informed that the route is being cloaked (e.g., the list of candidates for petitions may be a list of routes recently cloaked by other routers 105).

In some examples, as mentioned above, the network management system 115 monitors (e.g., through the first collector 110a and the second collector 110b) the traffic processed by the routers 105 of the first autonomous system 120a (e.g., the traffic processed by the first router 105a and the second router 105b). As such, the network management system 115 may be able to detect the reception, by the first router 105a, of any petitions to resume supporting the route. In such an example, the network management system 115 may notify network operations administration systems of the receipt of any such petitions; the receipt of a petition may be an indication that a configuration change made in accordance with instructions from network operations had the—perhaps unintended—effect of depriving a peering router, e.g., one of the peering routers 105c and 105d, of access to the resource 107. The ability to detect this circumstance may be especially advantageous because (as mentioned above) a configuration change that deprives the peering routers 105c and 105d of access to the resource 107 may not deprive routers 105 in the first autonomous system 120a of access to the network, so that, within the first autonomous system 120a, the unintended consequences of the configuration change may not be immediately apparent.

In some examples, the network management system 115 may participate in the decision to withdraw a route or to cloak a route. For example, the network management system 115 may determine that the route to the resource 107, provided by the first router 105a, is no longer needed. It may then determine whether it is more appropriate to cloak the route or to withdraw the route. For example, if the resource 107 is a network with a size that exceeds a threshold, the network management system 115 may instruct the first router 105a to cloak the route; otherwise, the network management system 115 may instruct the first router 105a to withdraw the route.

The network management system 115 may also be able to detect, for example, after the second router 105b advertises a route to the network, and the first router 105a advertises withdrawal of its route to the network, that the second router 105b is not providing reliable access to the network (e.g., because its physical link to the network is unreliable). The network management system 115 may make this determination, for example, by monitoring advertisements sent by the second router 105b, which, in a situation with an unreliable physical link, may consist of route advertisements alternating with route withdrawal advertisements. If the network management system 115 detects such a situation (e.g., one in which the route to the resource 107 via the first router 105a has been cloaked, and the route to the network via the second router 105b is unreliable), it may send a petition to resume supporting the route to the first router 105a. In examples, the determination may include whether the second route (provided by second router 105b) meets a reliability threshold, which may be defined in a variety of manners (including, e.g., a number or recency of a withdrawal announcement(s) for the second route).

Figure 2A:
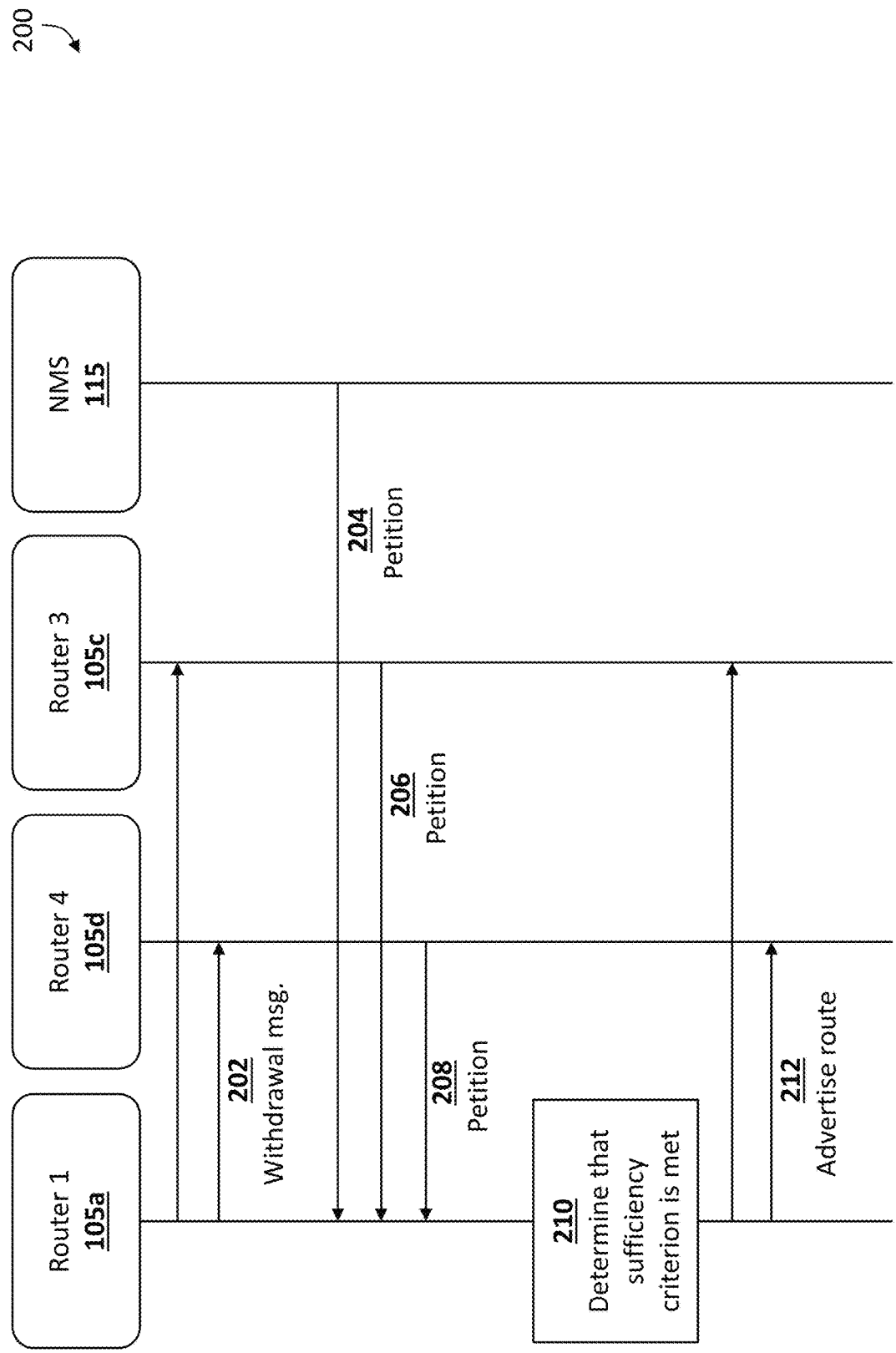
FIG. 2A illustrates a method for cloaking routes, according to an example of the present disclosure.

FIG. 2A depicts an example method 200 in which aspects of the present technology may be practiced by the first router 105a, the third router 105c, the fourth router 105d, and the network management system 115. As discussed, in examples, the first router 105a may determine that a route to a network is to be cloaked, and it may, at 202, advertise the withdrawal of the route (e.g., it may send a withdrawal message to the peering routers 105c and 105d). The first router 105*a* may then receive one or more petitions to resume supporting the route. For example, as discussed, the network management system 115 may determine that the second router 105*b*, which ordinarily would provide access to the network via an alternate route, is not reliably providing such access, and, in response, the network management system 115 may send, at 204, to the first router 105*a*, a petition to resume supporting the route. The third router 105*c* may also (e.g., after receiving a withdrawal message from the second router 105*b* withdrawing the alternate route to the network) determine that it does not have access to the network, and it may also send, at 206, to the first router 105, a petition to resume supporting the route. The fourth router 105*d* may also, for reasons similar to those of the third router 105*c*, send, at 208, to the first router 105, a petition to resume supporting the route. At 210, the first router 105*a* may determine that a sufficiency condition has been met (e.g., having received a number of petitions (including the three petitions sent at 204, 206, and 208) exceeding a threshold), and, at 212, it may advertise the (previously cloaked) route to the network and resume supporting the route.

Figure 2B:
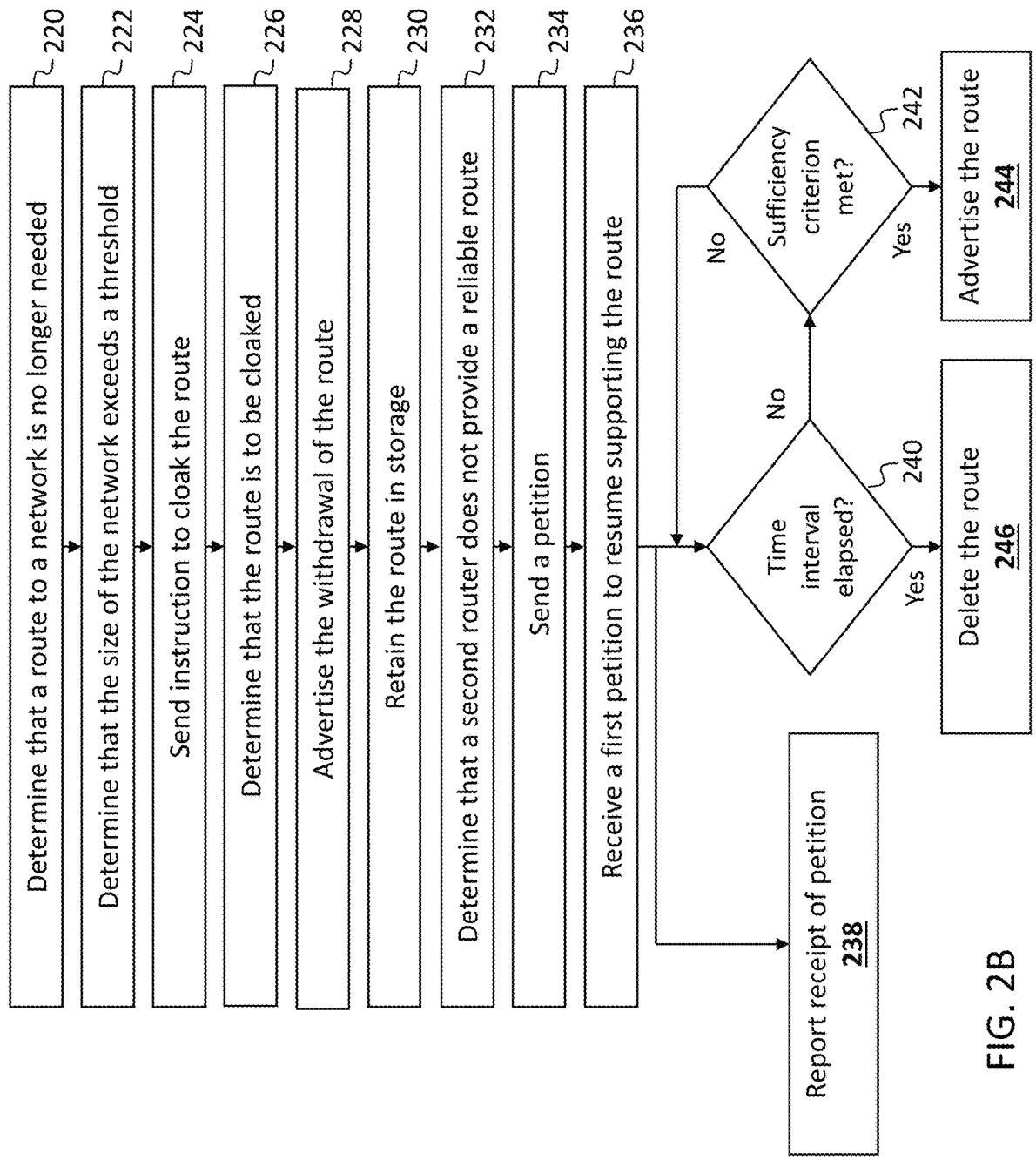
FIG. 2B illustrates a method for cloaking routes, according to an example of the present disclosure.

FIG. 2B is a flow chart of steps a system may be configured to perform, in some examples. The system comprises a first router 105*a*, and a network management system 115. The network management system 115 may be configured to determine, at 220, that a route to a network is no longer needed. The determining may be based, for example, on another router (e.g., the second router 105*b*), being brought into service.

The network management system 115 may be further configured to determine, at 222, that a size of the network exceeds a threshold. The threshold may be selected to be one that is exceeded when a network is sufficiently large that, if it were to become unavailable, the impact would be significant.

The network management system 115 may be further configured, in response to determining that the network size exceeds a threshold, to instruct, at 224, the first router 105*a* to cloak the route. The instruction may be, for example, a configuration command sent to the first router 105*a*.

The first router 105*a* may be configured to determine, at 226, that a route to a resource 107 is to be cloaked. The first router 105*a* may make this determination, for example, by receiving an instruction (e.g., from the network management system 115) that the route is to be cloaked.

The first router 105*a* may be further configured to advertise, at 228, the withdrawal of the route. The advertising may involve, for example, sending a suitable Border Gateway Protocol update message.

The first router 105*a* may be further configured retain, at 230, the route in storage. For example, instead of deleting the route from a set of routes stored by the first router 105*a*, the first router may leave the route in the set, and store an indication (e.g., with the route, or in a separate table of cloaked routes) that the route is cloaked.

The network management system 115 may be further configured to determine, at 232, that the second router 105*b* does not provide the second route reliably. For example, the network management system 115 may detect that the second router 105*b* is alternately advertising and withdrawing the route.

The network management system 115 may be further configured, in response to determining that the second router does not provide the second route reliably, to send, at 234, a petition to the first router 105*a*. The petition may be a petition to resume supporting the route.

The first router 105*a* may be further configured to receive, at 236, a petition to resume supporting the route. The petition may be received, e.g., from another router (e.g., in another autonomous system), or from the network management system 115.

The network management system 115 may be further configured to monitor the receiving of petitions by the first router 105*a*, and, in response to detecting that the first router 105*a* has received a petition (e.g., another petition, sent by another router 105), to report, at 238, that the first router has received a first petition to resume supporting the route.

The first router 105*a* may be further configured to determine, at 240, whether a time interval has elapsed. The time interval may be set by the network management system 115, which may configure the first router 105*a*, using a suitable configuration command, with a time interval to be used.

If the time interval has not elapsed, the first router 105*a* may determine, at 242, whether a sufficiency criterion is met. The sufficiency criterion may be a criterion that is met if a certain number of petitions have been received, or if weights associated with petitions that have been received are sufficiently great. If the sufficiency criterion is not met, control may return to step 240. The loop including step 240 and step 242 may repeat until either the time interval has elapsed or the sufficiency criterion is met.

The first router 105*a* may be further configured, when it is determined (at 242) that the sufficiency criterion is met prior to expiration of a time interval, to advertise the route, at 244. In this manner the route may be restored to service if a sufficient number of other devices request, before the time interval elapses, that the first router 105*a* resume supporting the route.

The first router 105*a* may be further configured, when it is determined that the sufficiency criterion is not met prior to the expiration of the time interval, to delete, at 246, the route in storage. The deleting of the route may free up memory in the first router 105*a*.

Figure 2C:
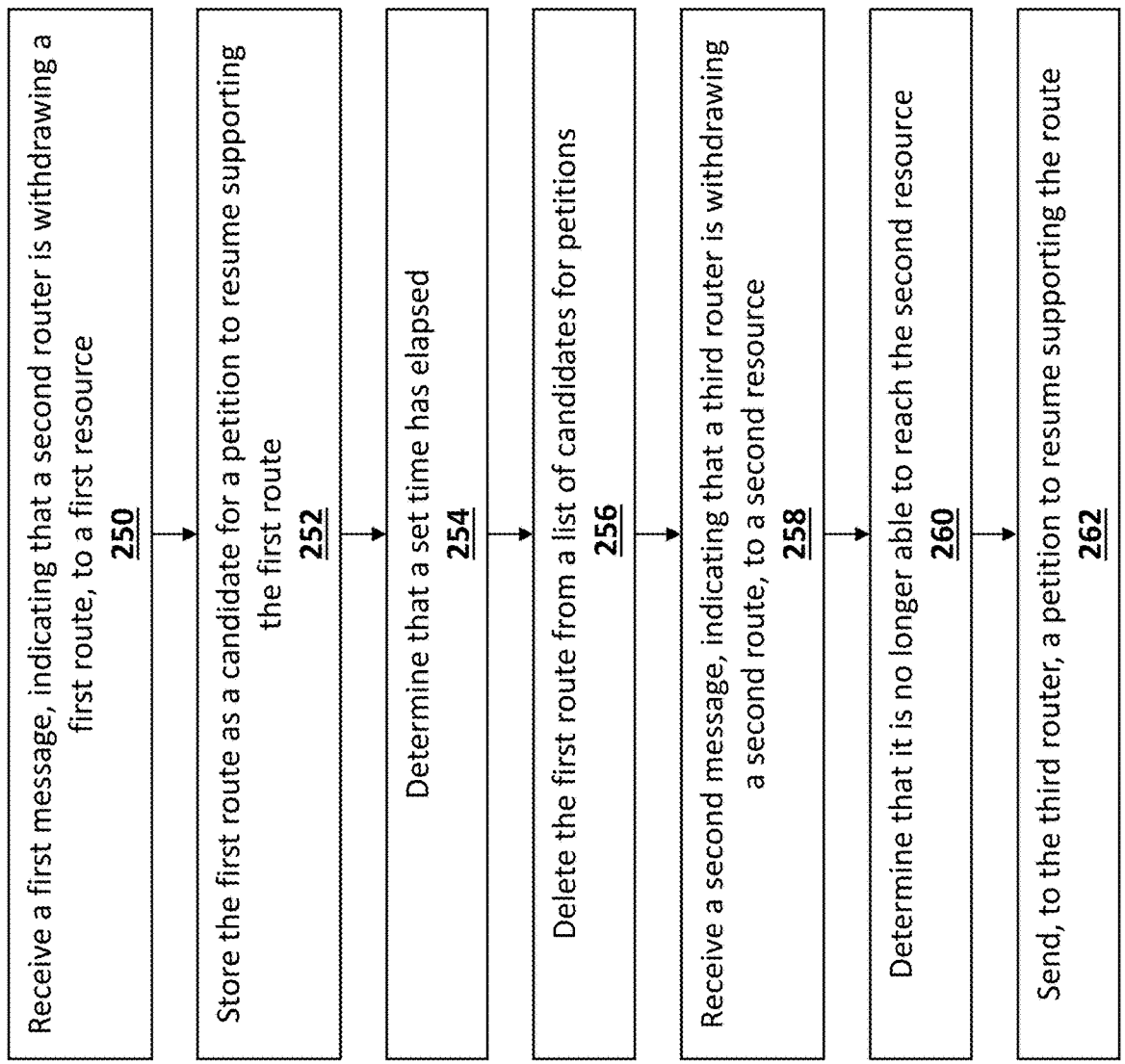
FIG. 2C illustrates a method for cloaking routes, according to an example of the present disclosure.

FIG. 2C is a flow chart of steps a system may be configured to perform, in some examples. The system may include a first router (e.g., the third router 105*c* of FIG. 1) the first router being configured to receive, at 250, a first message, indicating that a second router (e.g., the first router 105*a* of FIG. 1) is withdrawing a first route, to a first resource (e.g., resource 107).

The first router may be further configured to store, at 252, the first route as a candidate for a petition to resume supporting the first route. The storing of the route as a candidate for a petition may be performed, by the first router, in anticipation of the possibility of discovering, in the future, a need to use the route.

The first router may be further configured to determine, at 254, that a set time has elapsed. The set time may be a time after which the first router is configured to delete the route.

The first router may be further configured to delete, at 256, the first route from the list of candidates for petitions. This deleting may be in response to the determining, at 254, that the set time has elapsed.

The first router may be further configured to receive, at 258, a second message, indicating that a third router is withdrawing a second route, the second route being a route to a second resource (e.g., second resource 108). The second resource may be a network, for example.

The first router may be further configured to determine, at 260, that it is no longer able to reach the second resource. The first router's loss of the ability to reach the second resource may be the result, for example, of the second router's having cloaked or withdrawn the second route as a result of an erroneous configuration command.

The first router may be further configured to send, at 262, to the third router, a petition to resume supporting the second route. The petition may be sent in an attempt, by the first router, to restore its access to the resource.

Figure 3:
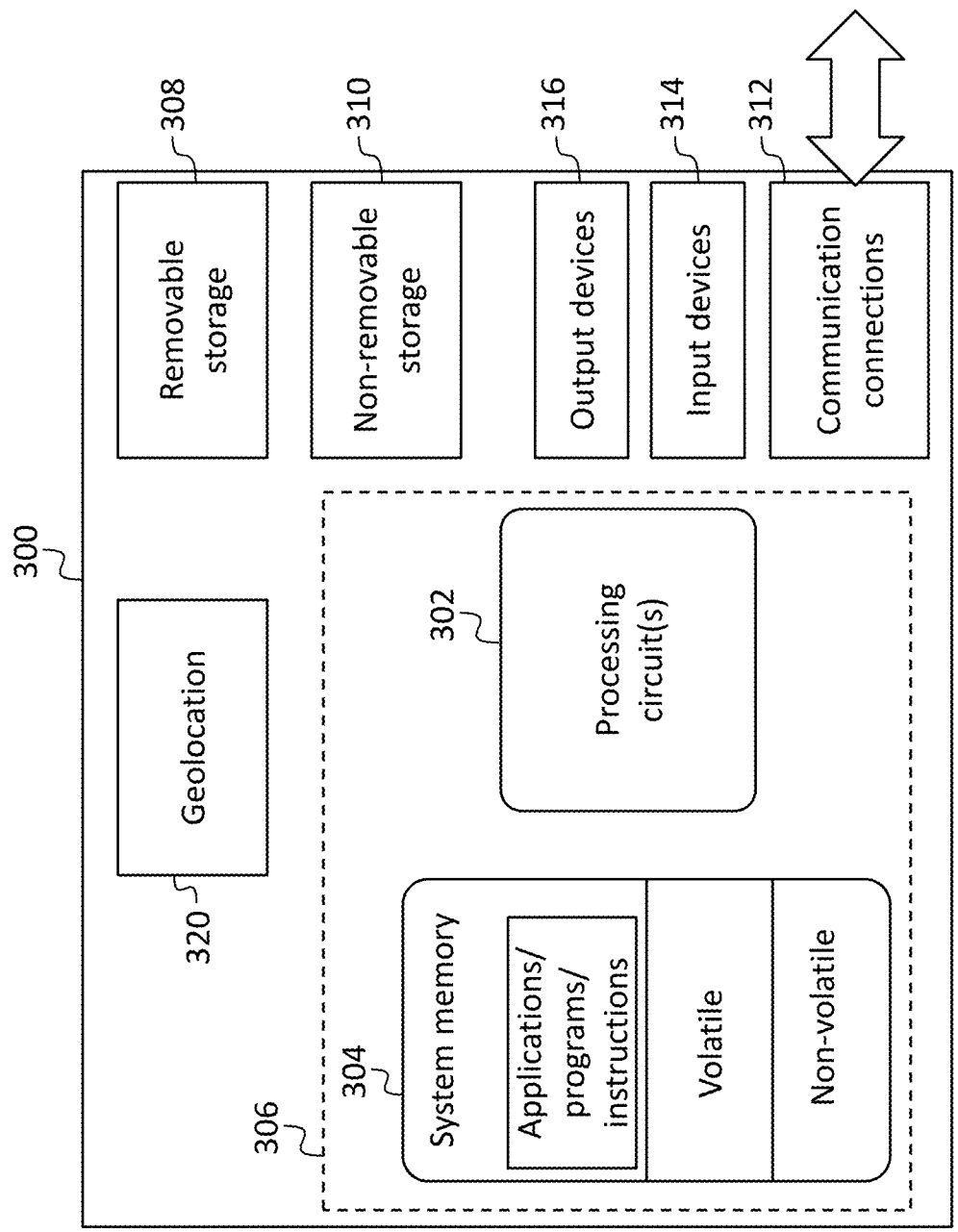
FIG. 3 is a block diagram of an operating environment, according to an example of the present disclosure.

FIG. 3 depicts an example of a suitable operating environment 300, portions of which may be used to implement the routers 105, the first collectors 110, the network management system 115, or other devices that may include computing functionality within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Those skilled in the art will recognize that the methods and systems of the present disclosure may be implemented in many manners and as such are not to be limited by the foregoing aspects and examples. In other words, functional elements being performed by a single or multiple components. In this regard, any number of the features of the different aspects described herein may be combined into single or multiple aspects, and alternate aspects having fewer than or more than all of the features herein described are possible. Functionality may also be, in whole or in part, distributed among multiple components, in manners now known or to become known.

Although exemplary embodiments of systems and methods have been specifically described and illustrated herein, many modifications and variations will be apparent to those skilled in the art. Accordingly, it is to be understood that systems and methods constructed according to principles of this disclosure may be embodied other than as specifically described herein. The invention is also defined in the following claims, and equivalents thereof.

What is claimed is:

1. A system, comprising:
  a first router, comprising at least one processing circuit and memory, operatively connected to the at least one processing circuit, the first router being configured to:
  determine that a route to a resource is to be cloaked;
  advertise the withdrawal of the route;
  retain the route in storage;
  determine whether a sufficiency criterion is met, wherein the determining whether a sufficiency criterion is met comprises determining whether at least a plurality of petitions have been received by the first router, wherein the plurality of petitions supports resuming the route; and
  when it is determined that the sufficiency criterion is met prior to expiration of a time interval, advertise the route; and
  when it is determined that the sufficiency criterion is not met prior to the expiration of the time interval, delete the route in storage.

2. The system of claim 1, wherein the advertising of the withdrawal comprises transmitting a withdrawal advertisement including an attribute indicating that the route has been cloaked.

3. The system of claim 2, wherein the advertisement includes an attribute indicating the time interval.

4. The system of claim 3, wherein the first router is part of a first autonomous system further configured to advertise the withdrawal of the route to at least a second router in a different autonomous system.

5. The system of claim 1, wherein the receiving of the plurality of petitions comprises receiving the plurality of petitions with authentication.

6. The system of claim 1, wherein the receiving of the plurality of petitions comprises receiving the plurality of petitions as Border Gateway Protocol (BGP) update messages with a "community" attribute set to signal an authenticated petition.

7. The system of claim 1, wherein the sufficiency criterion is met when a number of petitions of the plurality of petitions exceeds a threshold.

8. The system of claim 1, wherein:
each of the plurality of petitions includes a weight associated with a petition sender of a plurality of petition senders; and
the sufficiency criterion is met based on the weight associated with each petition sender of the plurality of petition senders.

9. The system of claim 1, further comprising a network management system, connected to the first router.

10. The system of claim 9, wherein the network management system is configured:
to detect that the first router has received a first petition to resume supporting the route; and
to report that the first router has received a first petition to resume supporting the route.

11. The system of claim 10, wherein:
the route is a first route to a network;
a second router is configured to provide a second route to the network; and
the network management system is configured:
to determine that the second route does not meet a reliability threshold; and
in response to determining that the second route does not meet a reliability threshold, to send a first petition of the plurality of petitions.

12. The system of claim 9, wherein the determining that the route is to be cloaked comprises receiving an instruction to cloak the route.

13. The system of claim 9, wherein:
the route is a first route to a network; and
the network management system is configured:
to determine that the route is no longer needed;
to determine that a size of the network exceeds a threshold; and
in response to determining that the network size exceeds a threshold, to instruct the first router to cloak the route.

14. A system, comprising:
a first router, the first router being configured to:
receive a first message, indicating that a second router is withdrawing a first route, to a first resource;
store the first route as a candidate for a petition to resume supporting the first route;
determine that a set time has elapsed;
delete the first route from a list of candidates for petitions;
receive a second message, indicating that a third router is withdrawing a second route, the second route being a route to a second resource;
determine that the first router is no longer able to reach the second resource; and
send, to the third router, a petition to resume supporting the second route;
determining, by the third router, whether a sufficiency criterion is met, wherein the determining whether a sufficiency criterion is met comprises determining whether a plurality of petitions have been received by the third router, wherein the plurality of petitions supports resuming the second route; and
when it is determined that the sufficiency criterion is met prior to expiration of a time interval, advertising, by the third router, the second route; and
when it is determined that the sufficiency criterion is not met prior to the expiration of the time interval, deleting, by the third router, the second route in storage.

15. A method, comprising:
determining, by a first router, that a route is to be cloaked;
advertising, by the first router, the withdrawal of the route;
retaining, by the first router, the route in storage;
determining, by the first router, whether a sufficiency criterion is met, wherein the determining whether a sufficiency criterion is met comprises determining whether a plurality of petitions have been received by the first router, wherein the plurality of petitions supports resuming the route; and
when it is determined that the sufficiency criterion is met prior to expiration of a time interval, advertising, by the first router, the route; and
when it is determined that the sufficiency criterion is not met prior to the expiration of the time interval, deleting, by the first router, the route in storage.

16. The method of claim 15, wherein the advertising of the withdrawal comprises transmitting a withdrawal advertisement including an attribute indicating that the route has been cloaked.

17. The method of claim 16, wherein the advertisement includes an attribute indicating the time interval.

18. The method of claim 17, wherein the first router is part of a first autonomous system further configured to advertise the withdrawal of the route to at least a second router in a different autonomous system.

* * * * *